US006996508B1

(12) United States Patent
Culp et al.

(10) Patent No.: US 6,996,508 B1
(45) Date of Patent: Feb. 7, 2006

(54) SYSTEM AND METHOD FOR REMOTE RETROFIT IDENTIFICATION OF ENERGY CONSUMPTION SYSTEMS AND COMPONENTS

(75) Inventors: Charles H. Culp, College Station, TX (US); David E. Claridge, College Station, TX (US); Jeffrey S. Haberl, College Station, TX (US); William D. Turner, College Station, TX (US)

(73) Assignee: The Texas A&M University System, College Station, TX (US)

( * ) Notice: Subject to any disclaimer, the term of this patent is extended or adjusted under 35 U.S.C. 154(b) by 699 days.

(21) Appl. No.: 10/004,985

(22) Filed: Dec. 3, 2001

(51) Int. Cl.
*G06F 17/10* (2006.01)

(52) U.S. Cl. ........................... 703/2; 700/291; 705/412

(58) Field of Classification Search .................... 703/2; 700/291, 295; 705/412; 307/42
See application file for complete search history.

(56) References Cited

U.S. PATENT DOCUMENTS 5,115,967 A * 5/1992 Wedekind ................. 236/46 R
5,216,623 A 6/1993 Barrett et al. ............... 364/550
5,566,084 A * 10/1996 Cmar ......................... 700/276
5,651,264 A 7/1997 Lo et al. ........................ 62/230
5,852,560 A * 12/1998 Takeyama et al. ............ 700/97
6,014,716 A 1/2000 Ohara .......................... 710/14
6,178,362 B1 6/2000 Woolard et al. ............ 700/295
6,088,688 A 7/2000 Crooks et al. .............. 705/412
6,216,956 B1 4/2001 Ehlers et al. ................. 236/47
6,366,889 B1 4/2002 Zaloom ......................... 705/7
6,439,469 B1 * 8/2002 Gruber et al. .............. 237/8 R
6,577,962 B1 6/2003 Afshari ........................ 702/61
6,785,592 B1 * 8/2004 Smith et al. ................ 700/291
2003/0061091 A1 3/2003 Amaratunga et al. ......... 705/10

OTHER PUBLICATIONS

U.S. Appl. No. 10/004,988, filed Dec. 3, 2001, Culp, et al.
U.S. Appl. No. 10/004,549, filed Dec. 4, 2001, Culp, et al.
U.S. Appl. No. 10/027,943, filed Dec. 20, 2001, Culp, et al.
"*Data Mining to Improve Energy Efficiency in Buildings*", <http://www.knowledgeprocesssoftware.com/newweb/CounterDet>, (28 pages); Sep. 2001.

* cited by examiner

*Primary Examiner*—Albert W. Paladini
(74) *Attorney, Agent, or Firm*—Baker Botts L.L.P.

(57) ABSTRACT

A method for remote energy consumption system retrofit identification for a facility includes receiving energy consumption data associated with the facility, generating facility data associated with the facility, and receiving external variable data associated with the facility corresponding to the energy consumption data. The method also includes generating a first energy consumption model based on the facility data, the energy consumption data, and the external variable data. The method also includes generating a second energy consumption model based on the facility data and the external variable data. The method further includes determining energy consumption efficiency for the facility using the first and second energy consumption models and identifying a retrofit of an energy consumption system of the facility based on the energy consumption efficiency.

41 Claims, 4 Drawing Sheets

SYSTEM AND METHOD FOR REMOTE RETROFIT IDENTIFICATION OF ENERGY CONSUMPTION SYSTEMS AND COMPONENTS

TECHNICAL FIELD OF THE INVENTION

This invention relates in general to the field of energy systems and, more particularly, to a system and method for remote retrofit identification of energy consumption systems and components.

BACKGROUND OF THE INVENTION

Schools, office buildings, homes, department stores, hospitals, and other types of facilities consume energy in varying amounts using a variety of different types of systems and components. For example, energy consumption systems and components may be used for environmental control, such as heating and cooling, for lighting, for security system applications, for computer usage applications, and for a variety of other energy consumption applications corresponding to the particular type of facility.

Because the types of facilities vary to a generally large degree, the energy usage associated with each type of facility also varies to a generally large degree. For example, energy consumption systems and components associated with homes are different than the energy consumption systems and components associated with an office building or hospital, and generally use less energy per unit of conditioned area than the systems and components of the office building or hospital.

Accordingly, because energy usage varies among different types of facilities, different energy consumption systems and components are designed to accommodate the various energy usage requirements of a particular facility. Additionally, in order to evaluate the efficiency of particular energy consumption systems or components, information associated with the facility and the energy consumption systems and/or components must be determined, as well as the amount of energy used by the particular energy consumption systems and/or components. This information is also generally necessary to determine which energy consumption systems and/or components require repair, modification, or replacement. Obtaining the required information, however, generally requires access to the facility and/or the energy consumption systems and components. Accordingly, obtaining the required information is generally expensive and time-consuming.

SUMMARY OF THE INVENTION

Accordingly, a need has arisen for an improved system and method of remotely analyzing and identifying retrofits to energy consumption systems and components associated with a variety of facilities. The present invention provides a system and method for remote retrofit identification of energy consumption systems and components that addresses shortcomings and disadvantages associated with prior systems and methods.

According to one embodiment of the present invention, a method for remote energy consumption system retrofit identification for a facility includes receiving energy consumption data associated with the facility, generating facility data associated with the facility, and receiving external variable data associated with the facility corresponding to the energy consumption data. The method also includes generating a first energy consumption model based on the facility data, the energy consumption data, and the external variable data. The method also includes generating a second energy consumption model based on the facility data and the external variable data. The method further includes determining energy consumption efficiency for the facility using the first and second energy consumption models and identifying a retrofit of an energy consumption system of the facility based on the energy consumption efficiency.

According to another embodiment of the present invention, a system for remote energy consumption system retrofit identification for a facility includes a processor, a memory coupled to the processor, and an energy consumption database accessible by the processor. The energy consumption database includes energy consumption data associated with the facility. The system also includes a facility database accessible by the processor and containing facility data associated with the facility. The system further includes an external variable database accessible by the processor and containing external variable data corresponding to the energy consumption data. The system includes a configuration engine residing in the memory and executable by the processor. The configuration engine is operable to generate a first energy consumption model based on the facility data, the energy consumption data, and the external variable data, and generate a second energy consumption model based on the facility data and the external variable data. The system further includes an analysis engine residing in the memory and executable by the processor. The analysis engine is operable to determine energy consumption efficiency for the facility based on the first and second energy consumption models and identify a retrofit of an energy consumption system of the facility based on the energy consumption efficiency.

The present invention provides several technical advantages. For example, according to one embodiment of the present invention, present and optimal energy consumption models are generated for a facility. Based on the generated models, retrofits to existing energy consumption systems and components of the facility may be identified to yield energy usage efficiency and reduce energy usage costs. Additionally, the present invention may be used and implemented remotely from the facility.

Another technical advantage of the present invention includes identifying operating parameters of energy consumption systems and/or components associated with a facility, and determining whether modifications to the operating parameters should be performed to increase efficiency. For example, after identifying particular energy consumption systems and devices requiring retrofit applications using the generated models, modifications to particular operating parameters of existing energy consumption systems and components of the facility may be identified to increase energy usage efficiency.

Other technical advantages are readily apparent to those skilled in the art from the following figures, descriptions, and claims.

BRIEF DESCRIPTION OF THE DRAWINGS

For a more complete understanding of the present invention, and the advantages thereof, reference is now made to the following description, taken in conjunction with the accompanying drawings, wherein like reference numerals represent like parts, in which.

DETAILED DESCRIPTION OF THE INVENTION

Figure 1:
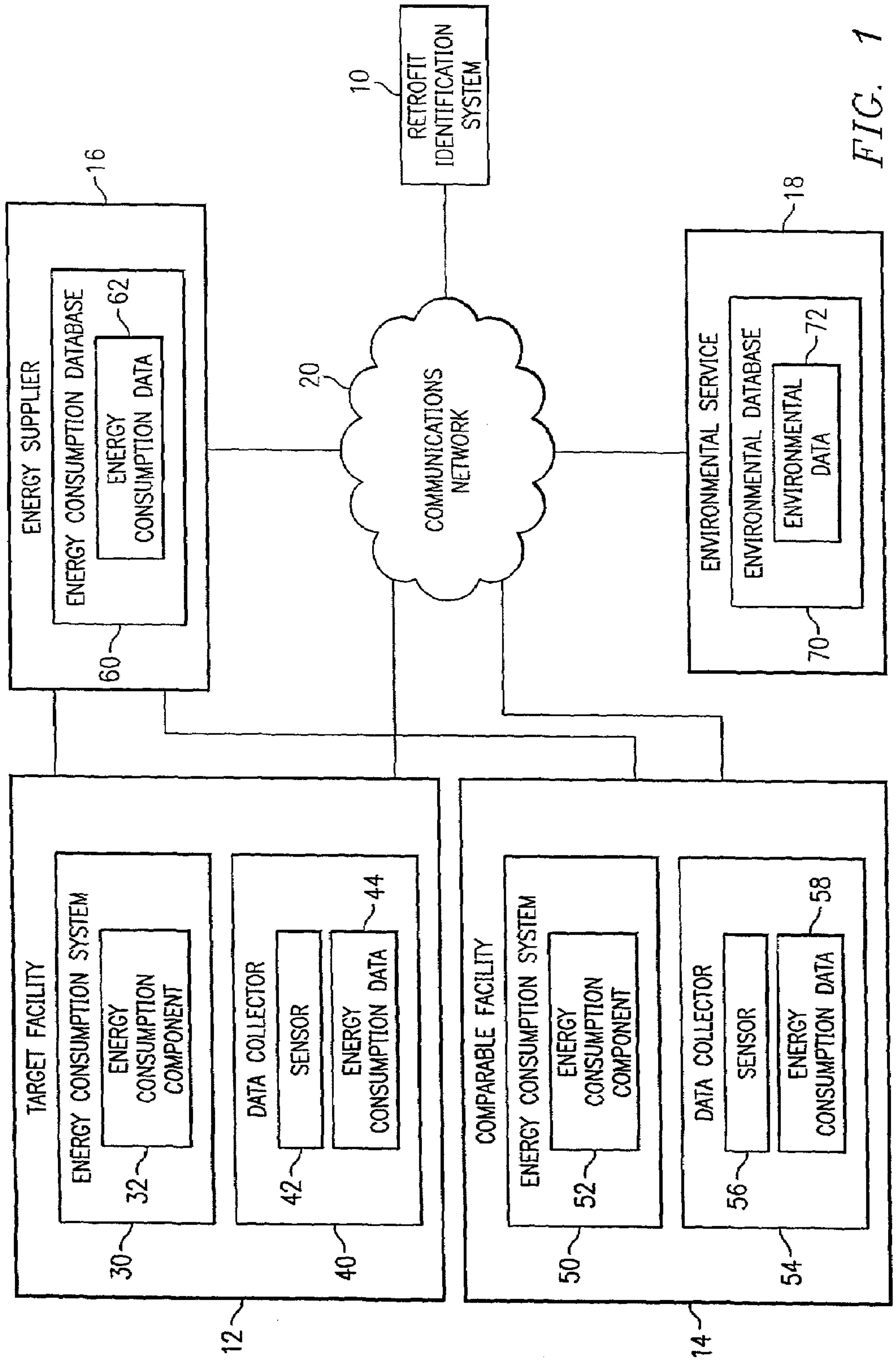
FIG. 1 is a block diagram illustrating a system for remote retrofit identification of energy consumption systems and components in accordance with an embodiment of the present invention.

FIG. 1 is a block diagram in which a system 10 for remote retrofit identification of energy consumption systems and components in accordance with an embodiment of the present invention is illustrated. In the illustrated embodiment, system 10 is coupled to a target facility 12, a comparable facility 14, an energy supplier 16, and an environmental service 18 via a communications network 20. The communications network 20 may be different networks, or the same network, and may include any Internet, intranet, extranet, or similar communication network. The communications network 20 provides an electronic medium for transmitting and receiving information between the system 10 and facilities 12 and 14, the environmental service 18, and the energy supplier 16. However, other electronic and non-electronic modes of communication may also be used for transmitting and receiving information between the system 10 and the facilities 12 and 14, the environmental service 18, and the energy supplier 16.

The target facility 12 includes one or more energy consumption systems 30 such as, but not limited to, heating and cooling systems, lighting systems, computer systems, medical systems, product manufacturing systems, and/or a variety of other types of energy consumption systems. Accordingly, each energy consumption system 30 may include one or more discrete energy consumption components 32. For example, a heating/cooling energy consumption system 30 may include energy consumption components 32 such as boilers, heat exchangers, fans, compressors, and other related components. Accordingly, depending on the type of energy consumption system 30, the energy consumption components 32 relate to the function and operation of the particular energy consumption system 30.

The target facility 12 may also include one or more data collectors 40 each coupled to or disposed proximate to one or more of the energy consumption systems 30 and/or components 32. Each data collector 40 may also include or be coupled to a sensor 42 for determining energy consumption or usage corresponding to energy consumption systems 30 and the energy consumption components 32. For example, each sensor 42 may be coupled to or disposed proximate to a corresponding energy consumption component 32 and/or system 30 to acquire energy consumption or other information associated with the operation and efficiency of a particular energy consumption system 30 and/or component 32, such as, but not limited to, electrical usage, water flow rates, internal and external temperature data, internal and external humidity values, wind speed and direction, precipitation, and cloud conditions. Each sensor 42 may also include processing, memory, communication, and other functional capabilities for collecting, processing, manipulating, storing, and/or transmitting the acquired information associated with a particular energy consumption component 32 and/or system 30.

Each data collector 40 may also include processing, memory, communication, and other functional capabilities for receiving, manipulating, processing, storing and/or transmitting the energy consumption and other information acquired by the sensors 42. For example, each data collector 40 may receive, process and store energy usage and/or environmental information associated with a particular energy consumption system 30 and/or component 32 as energy consumption data 44. The energy consumption data 44 may then be shared between one or more other data collectors 40, transmitted to a central monitoring station, or otherwise stored, transferred and/or manipulated.

Comparable facility 14 is generally a structure having similar or comparable energy consumption features as the target facility 12. For example, facilities 12 and 14 may both be a hospital, an office building, a department store, or other type of structure having similar energy usage characteristics such that the energy usage characteristics of the comparable facility 14 may be used to determine or approximate the energy usage characteristics for the target facility 12. As described above in connection with the target facility 12, the comparable facility 14 may also include one or more energy consumption systems 50 each comprising one or more energy consumption components 52. Also as described above in connection with the target facility 12, the comparable facility 14 may also include one or more data collectors 54, each data collector 54 comprising or coupled to one or more sensors 56. The data collectors 54 and sensors 56 may also be used to process and store energy usage information associated with the comparable facility 14, such as energy consumption data 58.

The energy supplier 16 generally includes a utility company or one or more other providers of various energy services or products to businesses, homes, or other energy users, such as, but not limited to, electricity, gas, oil, or other energy services and products. The energy supplier 16 generally includes an energy consumption database 60 containing energy consumption data 62 associated with each of the facilities 12 and 14. The energy consumption data 62 may reflect energy usage as a function of time and expressed in a variety of different formats; however, the energy consumption data 62 may also include other energy-related information within the scope of the present invention.

The environmental service 18 comprises a weather service, meteorological service, or other service containing weather and/or environmental information, such as, but not limited to, the National Weather Service or other regional or local weather services or stations. The environmental service 18 generally includes an environmental database 70 containing environmental data 72 corresponding to particular periods of time and associated with the vicinity of the facilities 12 and/or 14. The environmental data 72 may include temperature data, humidity measurements, wind speed and direction, precipitation, cloud conditions, and other environmental information that may affect energy usage or consumption during a particular period of time.

Briefly, the identification system 10 retrieves energy consumption information associated with the target facility 12 via the communications network 20 from the energy supplier 16 and/or directly from the target facility 12. The identification system 10 may also retrieve energy consumption information via the communications network 20 associated with the comparable facility 14 from the energy supplier 16 and/or directly from the comparable facility 14. Additionally, the identification system 10 retrieves environmental data 72 via the communications network 20 from the environmental service 18. Using the energy consumption information and the environmental data 72, the identification system 10 is used to remotely identify the energy consumption systems 30 and/or components 32 of the target facility 12 and analyze various operating parameters of the energy consumption systems 30 and/or components 32. The system 10 is described in greater detail below in connection with FIGS. 2, 3A, and 3B.

Figure 2:
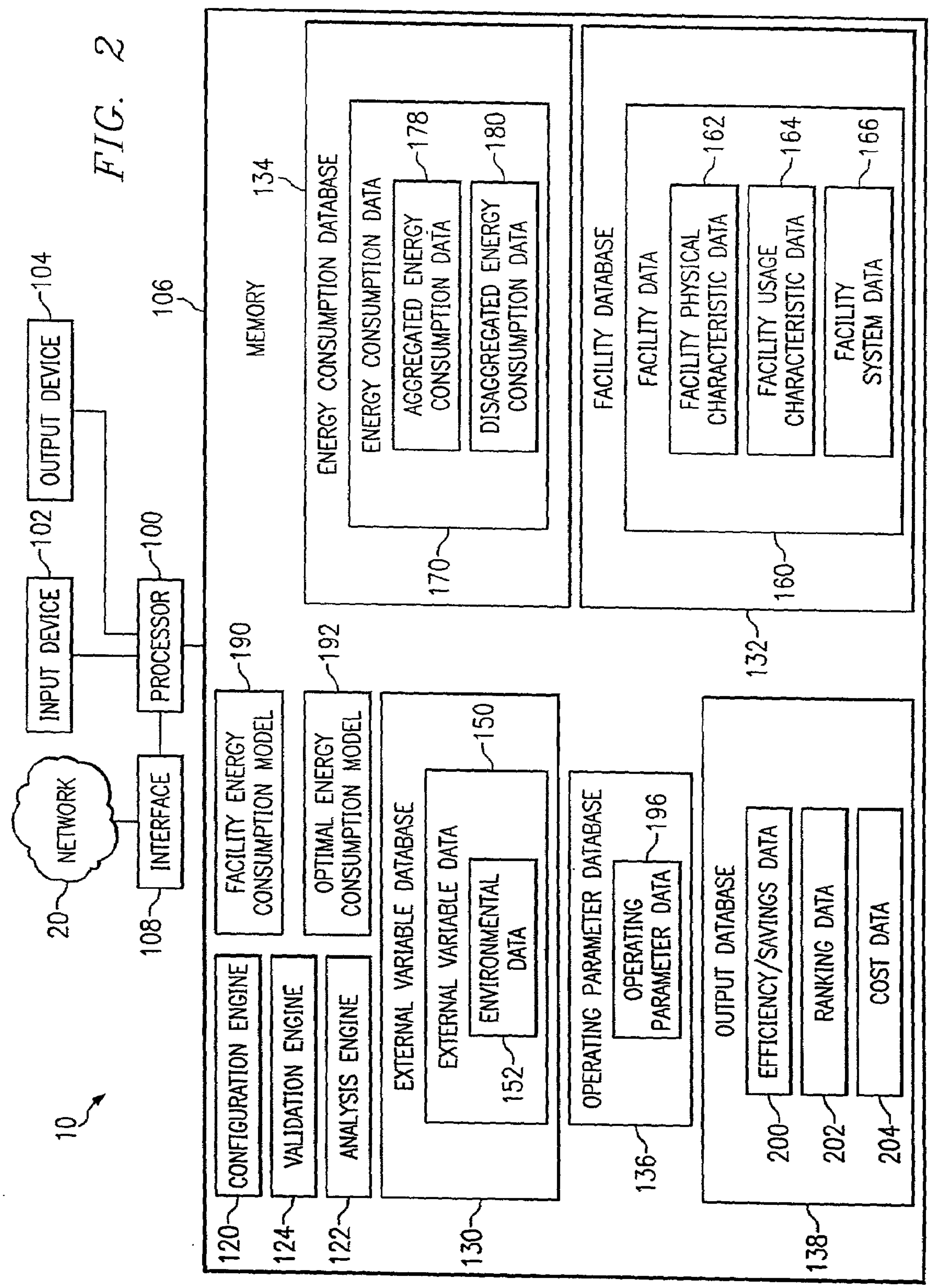
FIG. 2 is another block diagram illustrating the system for remote retrofit identification of energy consumption systems and components in accordance with an embodiment of the present invention.

FIG. 2 is a block diagram illustrating the system 10 in accordance with an embodiment of the present invention. In this embodiment, system 10 includes a processor 100, an input device 102, an output device 104, and a memory 106. The present invention also encompasses computer software that may be stored in memory 106 and executed by processor 100. The computer software may also be stored in a variety of other types of storage media including, but not limited to, floppy disk drives, hard drives, CD-ROM disk drives, or magnetic tape drives. Information, such as environmental data, energy usage data, or other types of information, may be received from a user of system 10 using a keyboard or any other type of input device 102. Output values or results may be output to a user of system 10 through output device 104, which may include a display, printer, or any other suitable type of output device. The system 10 may also include any suitable interface 108 for communicating via the communications network 20.

System 10 includes a configuration engine 120, an analysis engine 122 and a validation engine 124, which are computer software programs. In FIG. 2, the configuration engine 120, analysis engine 122 and validation engine 124 are illustrated as being stored in the memory 106, where they can be executed by the processor 100. However, the configuration engine 120, analysis engine 122 and validation engine 124 may also be stored on a variety of other suitable types of storage media.

System 10 also includes an external variable database 130, a facility database 132, an energy consumption database 134, an operating parameter database 136, and an output database 138. In FIG. 2, the external variable database 130, facility database 132, energy consumption database 134, operating parameter database 136, and output database 138 are illustrated as being stored in the memory 106, where they can be accessed by the processor 100. However, the databases 130, 132, 134, 136, and 138 may also be stored on a variety of other suitable types of storage media.

The external variable database 130 includes external variable data 150 associated with the target facility 12 and/or comparable facility 14. For example, the external variable data 150 may include environmental data 152 associated with the facilities 12 and 14. The environmental data 152 may include information associated with environmental conditions internal and external to the physical location of the facilities 12 and/or 14, such as temperature, humidity, wind speed and direction, precipitation, cloud condition, and other environment-related information. The environmental data 152 may be downloaded to the database 130 from the environmental service 18 via the communications network 20. The environmental data 152 may also be retrieved directly from the facilities 12 and/or 14 via the communications network 20. For example, as described above, the energy consumption data 44 and 58 associated with each of the respective facilities 12 and 14 may include information associated with the internal and external environmental conditions proximate to and affecting the operating parameters of the energy consumption systems 30 and 50 and/or components 32 and 52. It should be understood, however, that the environmental data 152 may be otherwise obtained and/or stored within the scope of the present invention.

The facility database 132 includes facility data 160 associated with the target facility 12 and/or comparable facility 14. For example, the facility data 160 may include facility physical characteristic data 162, facility usage characteristic data 164 and facility system data 166. The facility physical characteristic data 162 may include information corresponding to the physical features of target facility 12 or comparable facility 14, such as, but not limited to, the quantity of floors or levels, the square footage of each floor or level, whether the facility adjoins another structure, the architectural aspects of the facility, and the type of materials used in the construction of the facility.

The facility usage characteristic data 164 may include information associated with energy usage patterns and characteristics corresponding to the type of target facility 12 or comparable facility 14. For example, the data 164 may include information such as, but not limited to, whether the facility is a hospital, office building, department store, grocery store, home, or other type of facility, and the energy usage cycles and patterns associated with the type of facility, such as, but not limited to, periods of minimal or peak energy usage, the types of energy consumption systems and components generally used in corresponding types of facilities, whether one or more floors or levels of the facility incur greater energy usage than other levels or floors due to the energy usage applications generally found on the particular levels or floors, or other information associated with energy usage characteristics unique to the target facility 12 and/or 14. For example, a hospital may experience a generally consistent energy usage pattern, while an office building or department store may experience more cyclic energy usage patterns. Additionally, for example, in an office building application, one or more floors, or a portion of one or more floors, may be dedicated to computer server or network applications for providing computer services to various locations within the building. Accordingly, the floors or portions of floors containing the computer server and network applications may experience greater energy consumption than other floors of the building.

The facility system data 166 may include information corresponding to known energy consumption systems and/or components of the facilities 12 and/or 14. For example, all or a portion of the types of energy consumption systems and/or components of the facilities 12 and/or 14 may be known from either prior contact with the facilities 12 and/or 14, other facilities similar in size, structure or use applications as the facilities 12 and/or 14, or other sources of information.

The energy consumption database 134 includes energy consumption data 170 associated with the target facility 12 and/or comparable facility 14. The energy consumption data 170 may be downloaded via the communications network 20 from the energy supplier 16, the target facility 12, and/or the comparable facility 14. For example, the energy consumption data 62, the energy consumption data 44, and/or the energy consumption data 58 may be retrieved via the communications network 20 and stored in the energy consumption database 134 as the energy consumption data 170. However, the energy consumption data 170 may be otherwise received and stored within the scope of the present invention.

The energy consumption data 170 may include aggregated energy consumption data 178 and/or disaggregated energy consumption data 180 associated with the target facility 12 and/or comparable facility 14. The aggregated energy consumption data 178 generally includes energy usage information corresponding to the facilities 12 and/or 14 as a whole. The disaggregated energy consumption data 180 generally includes energy usage information corresponding to discrete systems 30, components 32, or types of energy used within and by the facilities 12 and 14. For example, the energy consumption data 44, 58 and 62 may include solely aggregated or disaggregated energy consumption information or a mixture of aggregated and disaggregated energy consumption information. The disaggregated energy consumption data 180 may be derived or extracted from the aggregated energy consumption information, as necessary, and stored in the energy consumption database 134.

In operation, the system 10 retrieves and stores the aggregated energy consumption data 178 and/or the disaggregated energy consumption data 180 from the energy supplier 16, the target facility 12, and/or the comparable facility 14. As described above, the aggregated energy consumption data 178 and the disaggregated energy consumption data 180 may be retrieved via the communications network 20 or other suitable electronic or non-electronic communication modes. The system 10 also retrieves and stores the external variable data 150 and the facility data 160 in a similar manner and as described above.

The analysis engine 122 may also be used to generate the facility data 160 using the aggregated energy consumption data 178 and/or the disaggregated energy consumption data 180. For example, the aggregated energy consumption data 178 and/or the disaggregated energy consumption data 180 may exhibit energy usage patterns generally associated with particular types of facilities and generally associated with particular sizes of facilities. Thus, the facility physical characteristic data 162 and facility usage characteristic data 164 may be derived from the aggregated energy consumption data 178 and/or the disaggregated energy consumption data 180.

The analysis engine 122 may further be used to generate and store the disaggregated energy consumption data 180 using the aggregated energy consumption data 178. For example, the analysis engine 122 may be used to generate the disaggregated energy consumption data 180 associated with the target facility 12 and/or the comparable facility 14 using the facility data 160, the aggregated energy consumption data 178, and the external variable data 150. For example, the aggregated energy consumption data 178 for particular periods or intervals of time and the environmental data 152 may be used to disaggregate the energy consumption information associated with the entire target facility 12 and/or comparable facility 14 where the energy consumption associated with the energy consumption components 32 or 52 may be additively combined. The analysis engine 122 may utilize heuristic and/or semi-empirical calculations to analyze the energy consumption of the energy consumption components 32 and 52 and to provide a mechanism for generating the disaggregated energy consumption data 180 from the aggregated energy consumption data 178. The analysis engine 122 may also use 1 parameter, 2 parameter, 3 parameter, 4 parameter, 5 parameter, change point multiple linear regression, or bin analysis techniques and calculations to analyze the energy consumption associated with the energy consumption components 32 and 52 to provide a mechanism for generating the disaggregated energy consumption data 180 from the aggregated energy consumption data 178. A weather-daytyping method for generating the disaggregated energy consumption data 180 may also be used by the analysis engine 122. For example, facilities using controlled sequencing of energy loads may be used to identify energy consumption levels of individual energy loads on consumption of the entire target facility 12 or comparable facility 14, combined with a 24-hour profile for generating the disaggregated energy consumption data 180. However, other methods may also be used to generate the disaggregated energy consumption data 180.

The validation engine 124 is used to validate the aggregated energy consumption data 178 and the disaggregated energy consumption data 180 to ensure that the aggregated and disaggregated energy consumption data 178 and 180 is complete and, therefore, not missing energy consumption information. For example, the aggregated and disaggregated energy consumption data 178 and 180 may include energy consumption information corresponding to specific time intervals or periods. The validation engine 124 determines whether energy consumption information is missing from the aggregated and disaggregated energy consumption data 178 and 180 and reconstructs the missing energy consumption information. For example, energy consumption data 58 from the comparable facility 14 may be retrieved and energy consumption information associated with particular time periods or intervals may be reconstructed from the energy consumption data 58 alone or in combination with the environmental data 152.

The configuration engine 120 is used to generate a facility energy consumption model 190 and an optimal energy consumption model 192 corresponding to the target facility 12. The facility energy consumption model 190 corresponds to a current or actual configuration of the target facility 12 associated with current energy usage information. For example, the configuration engine 120 generates the model 190 using the aggregated or disaggregated energy consumption data 178 and 180 in combination with one or more of the environmental data 152, the facility physical characteristic data 162, the facility usage characteristic data 164, and the facility system data 166 to identify precisely or approximately the energy consumption systems 30 and/or components 32 presently used by and contained within the target facility 12. Thus, the model 190 represents the current energy consumption configuration of the target facility 12. The configuration engine 120 may utilize energy balance rules, regression analysis, bin analysis, and other suitable techniques to derive and generate the models 190 and 192.

The optimal energy consumption model 192 corresponds to a configuration of the target facility 12 with energy consumption systems 30 and components 32 to increase and/or optimize energy usage efficiency. For example, the configuration engine 120 generates the model 192 using the aggregated or disaggregated energy consumption data 178 and 180 in combination with one or more of the environmental data 152, the facility physical characteristic data 162, and the facility usage characteristic data 164 to configure the facility with energy consumption systems 30 and components 32 to increase or optimize energy usage efficiency based on the environmental conditions within and surrounding the target facility 12 and the energy usage applications required by the target facility 12.

The configuration engine 120 may also be used to generate and store operating parameter data 196 in the operating parameter database 136. The operating parameter data 196 includes information associated with the operating parameters of the energy consumption systems 30 and/or components 32 of the target facility 12 based on the models 190 and/or 192. Additionally, the analysis engine 122 may be used to determine the operating efficiency of the systems 30 and/or components 32 of the target facility 12 for each of the models 190 and 192 using the operating parameter data 196. For example, using the environmental data 152, the facility data 160, the aggregated energy consumption data 178 and/or the disaggregated energy consumption data 180, the analysis engine 122 may determine the operating efficiency of the energy consumption systems 30 and/or components 32 for each of the models 190 and 192.

Based on the generated models 190 and 192, systems 30 and components 32 of the target facility 12 may be identified for retrofit applications. For example, the systems 30 and components 32 contained in each of the models 190 and 192 may be compared to determine differences between the models 190 and 192 and to identify the systems 30 and components 32 requiring operating parameter modification, repair, or replacement.

The output database 138 contains information associated with comparison and analysis of the models 190 and 192 and other information associated with the system 10. For example, the output database 138 may include efficiency/savings data 200, ranking data 202 and cost data 204. However, the output database 138 may also include other information associated with the energy consumption and analysis applications provided by the system 10.

The efficiency/savings data 200 includes information associated with the anticipated energy usage savings for the facility implementing all or a portion of the systems 30 and components 32 corresponding to the model 192. The data 200 includes information associated with efficiency differences between all or a portion of the systems 30 and components 32 corresponding to the models 190 and 192. The efficiency/savings data 200 may also include information associated with the predicted energy usage of all or a portion of the systems 30 and components 32 corresponding to the model 192. The ranking data 202 includes information associated with identifying which systems 30 or components 32 would yield the greatest to the least energy usage savings as a result of the recommended retrofit applications, which may also be based as a function of the cost of the retrofit applications. The cost data 204 includes information associated with an estimated cost to perform the recommended retrofit application, as well as information associated with a period of time to recover the cost of the retrofit application. However, other types of information may also be included within the output database 138 for analyzing and comparing the models 190 and 192.

Figure 3A:
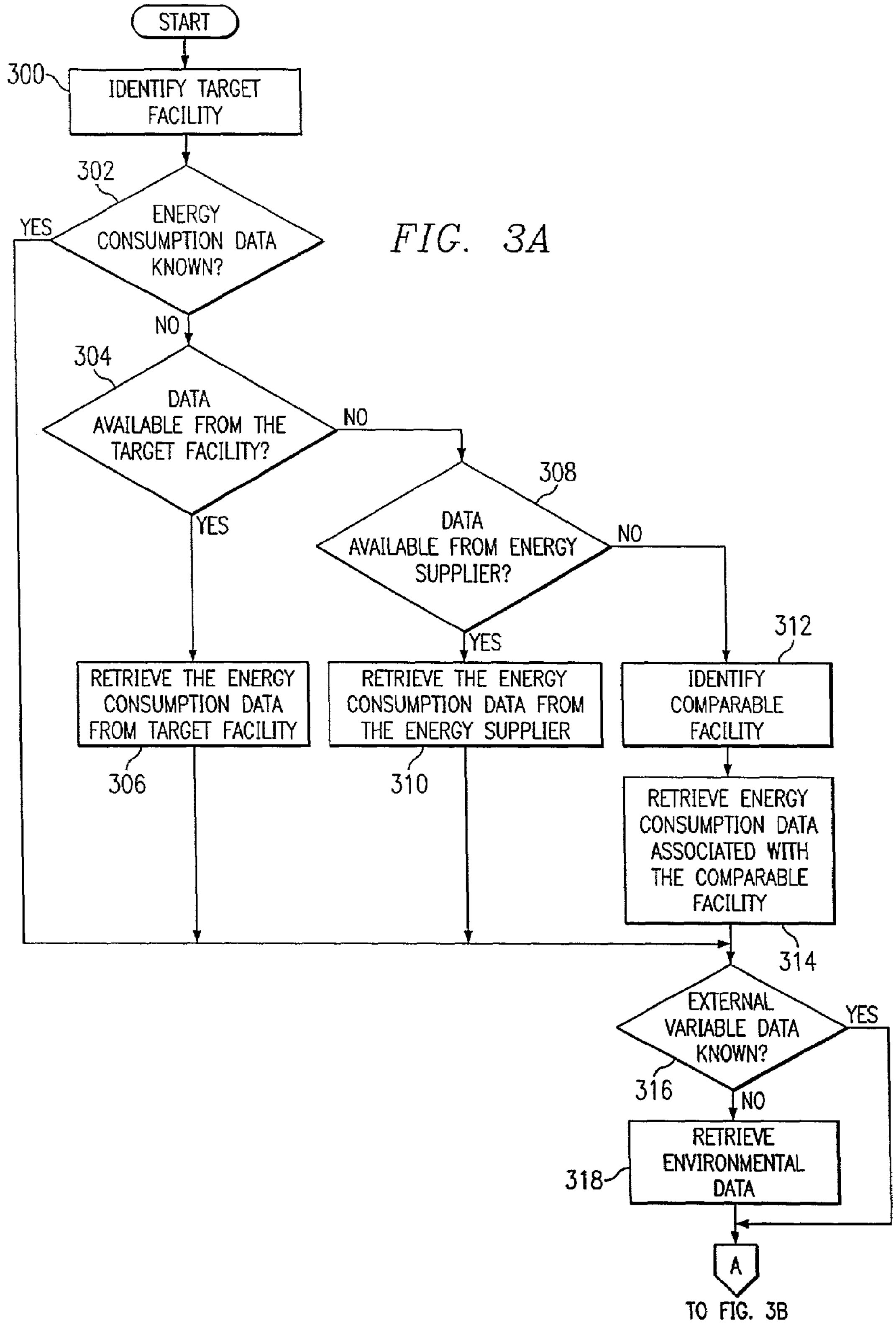
FIGS. 3A and 3B are flow charts illustrating a method of remote retrofit identification of energy consumption systems and components in accordance with an embodiment of the present invention.
Figure 3B:
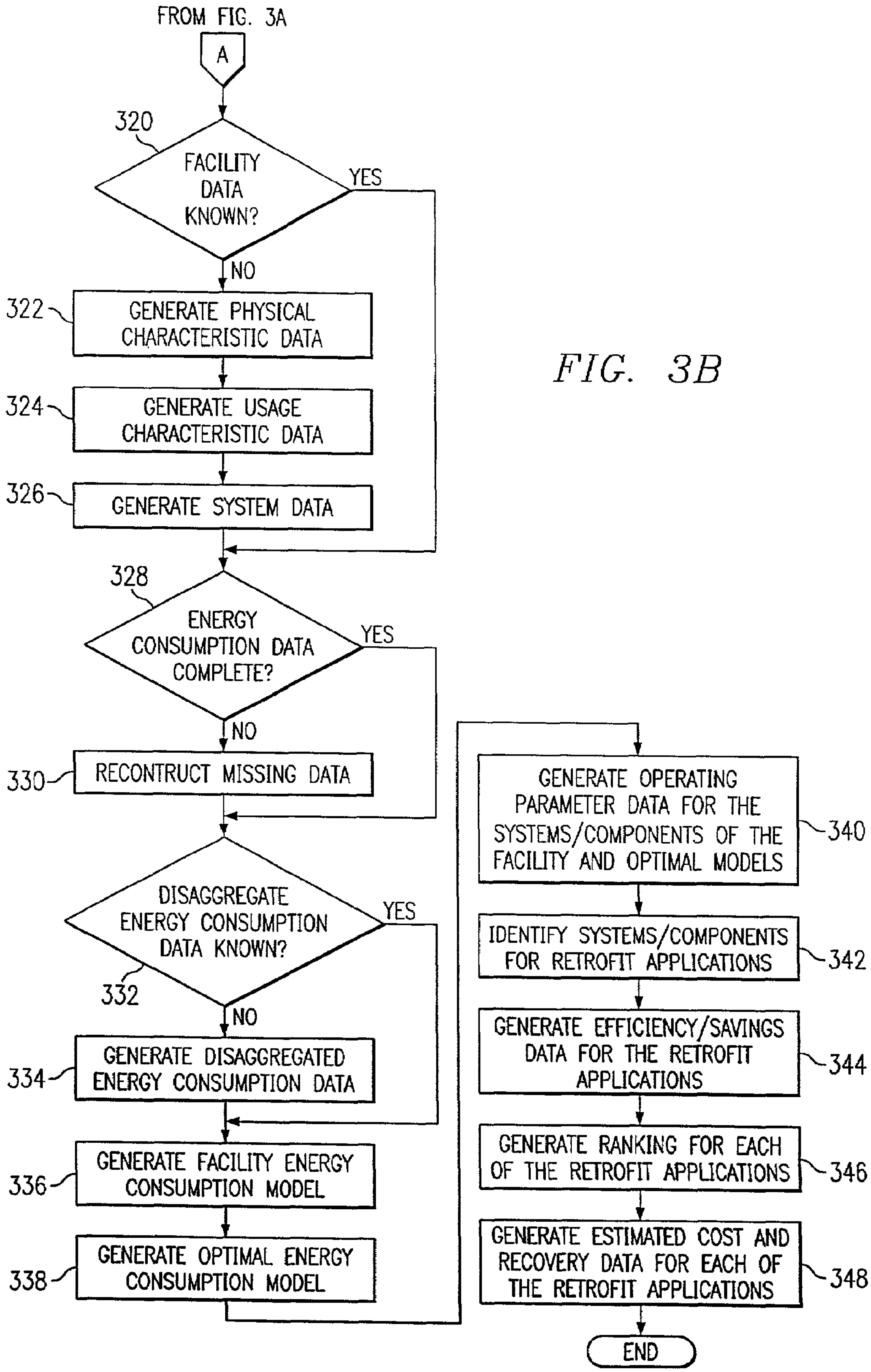

FIGS. 3A and 3B are flow charts illustrating a method for remote retrofit identification of energy consumption systems 30 and/or components 32 in accordance with an embodiment of the present invention. The method begins at step 300, where a target facility 12 is identified. At decisional step 302, a determination is made whether energy consumption data 170 for the target facility 12 is known. If the energy consumption data 170 for the target facility 12 is known, the method proceeds from step 302 to step 316. If the energy consumption data 170 for the target facility 12 is unknown, the method proceeds from step 302 to decisional step 304, where a determination is made whether the energy consumption data 170 is available directly from the target facility 12. If the energy consumption data 170 is available directly from the target facility 12, the method proceeds from step 304 to step 306, where the energy consumption data 44 may be retrieved from the data collector 40 of the target facility 12 via the communications network 20 and stored as the energy consumption data 170 in the form of aggregated energy consumption data 178 and/or disaggregated energy consumption data 180 in the energy consumption database 134.

If the energy consumption data 170 is not available directly from the target facility 12, the method proceeds from step 304 to decisional step 308, where a determination is made whether the energy consumption data 62 is available from the energy supplier 16. If the energy consumption data 62 is available from the energy supplier 16, the method proceeds from step 308 to step 310, where the energy consumption data 62 associated with the target facility 12 is retrieved via the communications network 20 and stored as the energy consumption data 170 in the form of aggregated energy consumption data 178 and/or disaggregated energy consumption data 180 in the energy consumption database 134.

If the energy consumption data 170 associated with the target facility 12 is not available from the energy supplier 16, the method proceeds from step 308 to step 312, where a comparable facility 14 is identified. At step 314, energy consumption data 170 associated with the comparable facility 14 is retrieved. For example, as described above in connection with the target facility 12, the energy consumption data 58 may be retrieved directly from the comparable facility 14 via the communications network 20, or the energy consumption data 62 associated with the comparable facility 14 may be retrieved from the energy supplier 16 via the communications network 20. However, as described above, energy consumption data 58 or 62 associated with the comparable facility 14 may be otherwise retrieved and stored as the energy consumption data 170.

At decisional step 316, a determination is made whether the external variable data 150 associated with either the target facility 12 or the comparable facility 14 is known. If the external variable data 150 is known, the method proceeds from step 316 to step 320. If the external variable data 150 is unknown, the method proceeds from step 316 to step 318, where the environmental data 152 is retrieved from the environmental service 18 via the communications network 20 corresponding to the facilities 12 and/or 14. For example, the environmental data 72 may be retrieved via the communications network 20 and stored as the environmental data 152 within the external variable database 130. Additionally, as described above, the energy consumption data 44 and 58 may also contain information associated with the internal and external environmental conditions of the respective facilities 12 and 14. Thus, the environmental information contained within the data 44 and 58 may be extracted and stored as the environmental data 152. However, as described above, the environmental data 152 may be otherwise retrieved and stored within the scope of the present invention.

At decisional step 320, a determination is made whether the facility data 160 associated with the target facility 12 is known. If the facility data 160 is known, the method proceeds from step 320 to step 328. If the facility data 160 associated with the target facility 12 is unknown, the method proceeds from step 320 to step 322, where the facility physical characteristic data 162 is generated for the target facility 12. For example, facility physical characteristic data 162 associated with the target facility 12 may be stored within the facility database 132, such as the size of the target facility 12, the quantity of floors or levels of the target facility 12, and other information associated with the physical characteristics of the target facility 12.

At step 324, the facility usage characteristic data 164 associated with the target facility 12 is generated and stored within the facility database 132. For example, the facility usage characteristic data 164 may include information such as whether the target facility 12 is a hospital, business, home, or other type of facility generally indicating energy consumption patterns associated with a particular type of target facility 12. At step 326, the facility system data 166 is generated and stored within the facility database 132.

At decisional step 328, a determination is made whether the energy consumption data 170 is complete. For example, the energy consumption data 170 may be incomplete such that energy consumption information is missing or is unavailable for various time periods or intervals. If the energy consumption data 170 is complete, the method proceeds from step 328 to step 332. If the energy consumption data 170 is incomplete, the method proceeds from step 328 to step 330, where the validation engine 124 is used to reconstruct the missing data. For example, as described above, the missing energy consumption information may be reconstructed using energy consumption data 58 associated with a comparable facility 14 in combination with the environmental data 152. Alternatively, the validation engine 124 may also use the energy consumption data 170 associated with the target facility 12 corresponding to other similar environmental conditions for other predetermined time periods or intervals to generate the missing energy consumption information.

At decisional step 332, a determination is made whether disaggregated energy consumption data 180 is known. If the disaggregated energy consumption data 180 is known, the method proceeds from step 332 to step 336. If the disaggregated energy consumption data 180 is not known, the method proceeds to step 334, where the disaggregated energy consumption data 180 is generated for the target facility 12 using the aggregated energy consumption data 178, the external variable data 150, and the facility data 160.

At step 336, the configuration engine 120 generates the facility energy consumption model 190 using the energy consumption data 170, the facility data 160, and the external variable data 150. At step 338, the configuration engine 120 generates the optimal energy consumption model 192 for the target facility 12. At step 340, operating parameter data 196 is generated for the systems 30 and components 32 of the models 190 and 192. As described above, after generation of the models 190 and 192 and the operating parameter data 196, efficiency comparisons can be made between the systems 30 and the components 32 of the models 190 and 192.

At step 342, the models 190 and 192 and the operating parameter data 196 may be used to compare efficiencies and costs for energy usage applications of the facility to identify the systems 30 and/or components 32 of the facility indicating or requiring retrofit application. At step 344, the efficiency/savings data 200 for each of the identified retrofit applications may be generated so that a user of the system 10 may review the efficiency comparisons and energy usage cost savings for particular retrofit applications in greater detail. At step 346, ranking data 202 for the retrofit applications may be generated, thereby indicating to a user of the system 10 which retrofit applications may yield the greatest energy usage cost savings for the least resource investment. At step 348, the cost data 204 for each of the retrofit applications may be generated corresponding to the investment cost to perform each of the retrofit applications.

Thus, the present invention provides a system 10 for remotely analyzing the energy consumption systems and components of a facility and identifying retrofit applications corresponding to the systems and components of the facility to increase energy usage efficiency and reduce energy usage costs. Additionally, the present invention substantially reduces or eliminates the costs and time associated with site visits to facilities to obtain the required energy usage information for performing retrofit analysis.

Although the present invention has been described in detail, various changes and modifications may be suggested to one skilled in the art. It is intended that the present invention encompass such changes and modifications as falling within the scope of the appended claims.

What is claimed is:

1. A method for remote energy consumption system retrofit identification for a facility, comprising:

receiving energy consumption data associated with the facility;

generating facility data associated with the facility;

receiving external variable data associated with the facility corresponding to the energy consumption data;

generating a first energy consumption model based on the facility data, the energy consumption data, and the external variable data;

generating a second energy consumption model based on the facility data and the external variable data;

determining energy consumption efficiency for the facility using the first and second energy consumption models; and identifying a retrofit of an energy consumption system of the facility based on the energy consumption efficiency.

2. The method of claim 1, further comprising validating the energy consumption data.

3. The method of claim 2, wherein validating the energy consumption data comprises:

analyzing the energy consumption data for missing data; and reconstructing the missing data.

4. The method of claim 3, wherein reconstructing the missing data comprises:

identifying a comparable facility;

retrieving energy consumption data associated with the comparable facility; and reconstructing the missing data for a specified time period using the energy consumption data associated with the comparable facility.

5. The method of claim 1, wherein receiving the energy consumption data comprises receiving the energy consumption data from an energy consumption database of an energy supplier.

6. The method of claim 1, wherein receiving the energy consumption data comprises receiving the energy consumption data from a data collector disposed at the facility.

7. The method of claim 1, wherein generating the facility data comprises generating the facility data using the energy consumption data.

8. The method of claim 1, wherein generating the facility data comprises generating the facility data using physical characteristic data associated with the facility.

9. The method of claim 1, further comprising generating efficiency/savings data associated with the retrofit.

10. The method of claim 1, further comprising identifying an energy consumption component of the facility using the first energy consumption model, and wherein generating the facility data comprises generating the facility data based on the energy consumption component.

11. The method of claim 1, wherein receiving the external variable data comprises receiving environmental data corresponding to the energy consumption data.

12. The method of claim 11, further comprising validating the environmental data.

13. The method of claim 1, wherein determining energy consumption efficiency comprises:

determining energy usage for the facility based on the second energy consumption model; and comparing the energy usage based on the second energy consumption model with the energy consumption data.

14. The method of claim 1, further comprising:

identifying a comparable facility; and retrieving energy consumption data associated with the comparable facility; and wherein generating the first energy consumption model further comprises generating the first energy consumption model using the energy consumption data associated with the comparable facility.

15. The method of claim 1, further comprising determining cost data associated with implementing the retrofit.

16. The method of claim 1, further comprising:

determining a plurality of retrofits for the facility; and generating ranking data associated with the plurality of retrofits.

17. The method of claim 1, wherein generating the facility data comprises:

generating physical characteristic data corresponding to the facility;

generating energy usage characteristic data associated with the facility; and generating system data associated with the facility.

18. The method of claim 1, wherein receiving the energy consumption data comprises:

receiving aggregated energy consumption data associated with the facility; and generating disaggregated energy consumption data associated with the facility using the aggregated energy consumption data.

19. The method of claim 1, wherein generating the facility data comprises:

generating physical characteristic data associated with the facility; and generating energy usage characteristic data associated with the facility.

20. A system for remote energy consumption system retrofit identification for a facility, comprising:

a processor;

a memory coupled to the processor;

an energy consumption database accessible by the processor, the energy consumption database having energy consumption data associated with the facility;

a facility database accessible by the processor, the facility database having facility data associated with the facility;

an external variable database accessible by the processor, the external variable database having external variable data corresponding to the energy consumption data;

a configuration engine residing in the memory and executable by the processor, the configuration engine operable to generate a first energy consumption model based on the facility data, the energy consumption data, and the external variable data, the configuration engine further operable to generate a second energy consumption model based on the facility data and the external variable data; and an analysis engine residing in the memory and executable by the processor, the analysis engine operable to determine energy consumption efficiency for the facility based on the first and second energy consumption models, the analysis engine further operable to identify a retrofit of an energy consumption system of the facility based on the energy consumption efficiency.

21. The system of claim 20, further comprising a validation engine residing in the memory and executable by the processor, the validation engine operable to validate the energy consumption data.

22. The system of claim 21, wherein the validation engine is operable to analyze the energy consumption data for missing data and, in response to determining that missing data exists, reconstruct the missing data.

23. The system of claim 20, wherein the energy consumption data comprises energy consumption data residing in an energy consumption database of an energy supplier.

24. The system of claim 20, wherein the energy consumption data comprises:

aggregated energy consumption data associated with the facility; and disaggregated energy consumption data associated with discrete energy consumption systems of the facility.

25. The system of claim 24, wherein the analysis engine is further operable to generate the disaggregated energy consumption data from the aggregated energy consumption data.

26. The system of claim 20, wherein the facility data is generated based on the energy consumption data.

27. The system of claim 20, wherein the facility data comprises physical characteristic data associated with the facility.

28. The system of claim 27, wherein the facility data further comprises energy usage characteristic data associated with the facility.

29. The system of claim 28, wherein the facility data further comprises system data associated with the facility, the system data indicating a present energy consumption system of the facility.

30. The system of claim 20, wherein the external variable data comprises environmental data corresponding to the energy consumption data.

31. The system of claim 30, further comprising a validation engine residing in the memory and executable by the processor, the validation engine operable to validate the environmental data.

32. The system of claim 20, wherein the analysis engine is further operable to determine a modification to operating parameters of an energy consumption system of the facility based on the energy consumption efficiency.

33. The system of claim 20, wherein the analysis engine is further operable to generate efficiency/savings data associated with the retrofit.

34. The system of claim 33, wherein the efficiency/savings data comprises information corresponding to predicted energy usage of the retrofit.

35. The system of claim 20, wherein the analysis engine is further operable to generate cost data associated with the retrofit, the cost data indicating an implementation cost corresponding to the retrofit.

36. The system of claim 20, wherein the analysis engine is further operable to determine a plurality of retrofits corresponding to different energy consumption systems of the facility, the analysis engine further operable to generate ranking data associated with each of the plurality of retrofits.

37. The system of claim 36, wherein the ranking data comprises information corresponding to energy savings information associated with each of the plurality of retrofits as a function of implementation costs associated with each of the plurality of retrofits.

38. The system of claim 20, wherein the energy consumption data comprises energy consumption data retrieved from a data collector disposed at the facility.

39. The system of claim 20, wherein the analysis engine is further operable to determine operating parameter data for an energy consumption system of the facility corresponding to each of the first and second models.

40. The system of claim 20, wherein the energy consumption data comprises energy consumption data associated with a comparable facility.

41. The system of claim 20, wherein the analysis engine is further operable to generate an operating parameter data associated with an energy consumption component of the energy consumption system corresponding to each of the first and second models.

* * * * *